United States Patent
Schatzberger

(10) Patent No.: US 8,860,498 B2
(45) Date of Patent: Oct. 14, 2014

(54) CHARGE PUMP CIRCUIT AND METHOD FOR GENERATING A SUPPLY VOLTAGE

(71) Applicant: ams AG, Unterpremstätten (AT)

(72) Inventor: Gregor Schatzberger, Graz (AT)

(73) Assignee: ams AG, Unterpremstaetten (AT)

( * ) Notice: Subject to any disclaimer, the term of this patent is extended or adjusted under 35 U.S.C. 154(b) by 0 days.

(21) Appl. No.: 13/892,176

(22) Filed: May 10, 2013

(65) Prior Publication Data
US 2013/0300495 A1 Nov. 14, 2013

(30) Foreign Application Priority Data
May 14, 2012 (EP) ..................................... 12167854

(51) Int. Cl.
*H02M 3/07* (2006.01)
*H02M 1/00* (2006.01)

(52) U.S. Cl.
CPC ........ *H02M 3/07* (2013.01); *H02M 2001/0045* (2013.01); *H02M 2001/007* (2013.01)
USPC ...................................................... 327/536

(58) Field of Classification Search
None
See application file for complete search history.

(56) References Cited

U.S. PATENT DOCUMENTS

| | | | |
|---|---|---|---|
| 5,095,223 A * | 3/1992 | Thomas | 307/110 |
| 5,982,162 A | 11/1999 | Yamauchi | |
| 6,075,403 A * | 6/2000 | Ishikawa et al. | 327/536 |
| 6,229,385 B1 * | 5/2001 | Bell et al. | 327/565 |
| 6,445,623 B1 | 9/2002 | Zhang et al. | |
| 6,566,847 B1 | 5/2003 | Chou et al. | |
| 6,744,224 B2 * | 6/2004 | Ishii | 315/291 |
| 6,774,710 B2 | 8/2004 | Li | |
| 7,190,598 B1 * | 3/2007 | Alenin | 363/60 |
| 7,279,957 B2 * | 10/2007 | Yen | 327/536 |
| 7,365,592 B2 * | 4/2008 | Hirayama | 327/536 |
| 7,397,677 B1 * | 7/2008 | Collins et al. | 363/60 |

(Continued)

FOREIGN PATENT DOCUMENTS

| | | |
|---|---|---|
| DE | 102006060011 A1 | 7/2008 |
| EP | 1111763 A2 | 6/2001 |
| EP | 1980012 B1 | 10/2008 |

*Primary Examiner* — Thomas J Hiltunen
(74) *Attorney, Agent, or Firm* — McDermott Will & Emery LLP

(57) ABSTRACT

A charge pump circuit (11) comprises a first stage (31) and at least a second stage (32), each having a capacitor (130, 230) and a current source (100, 200). The charge pump circuit (11) is configured such that, in a first phase (A) of operation, the capacitor (130) of the first stage (31) is switched in series to the current source (100) of the first stage (31) and the capacitor (230) of the second stage (32) is switched in series to the current source (200) of the second stage (32) and that, in a second phase (B) of operation, the capacitor (130) of the first stage (31) and the capacitor (230) of the second stage (32) are switched in series for providing a supply voltage (VHF) at an output (15) of the charge pump circuit (11). A comparator signal (SCOM) is generated by comparing a voltage at an electrode of one of the capacitors (130, 230) of the first and the at least second stage (31, 32) with a reference voltage (VR). The first and the second phase (A, B) are set depending on the comparator signal (SCOM).

16 Claims, 9 Drawing Sheets

(56) References Cited

U.S. PATENT DOCUMENTS

| | | |
|---|---|---|
| 7,583,133 B2 * | 9/2009 | Ivanov et al. ............... 327/536 |
| 8,022,749 B2 | 9/2011 | Schatzberger et al. |
| 8,319,545 B2 * | 11/2012 | Sousa et al. ................ 327/536 |
| 8,384,306 B2 * | 2/2013 | Genest ........................ 315/307 |
| 2002/0154524 A1 * | 10/2002 | Yamanaka et al. ............. 363/59 |
| 2006/0044052 A1 * | 3/2006 | Hashimoto ................. 327/536 |
| 2009/0189681 A1 | 7/2009 | Ivanov et al. |
| 2010/0264981 A1 | 10/2010 | Augustyniak et al. |

\* cited by examiner

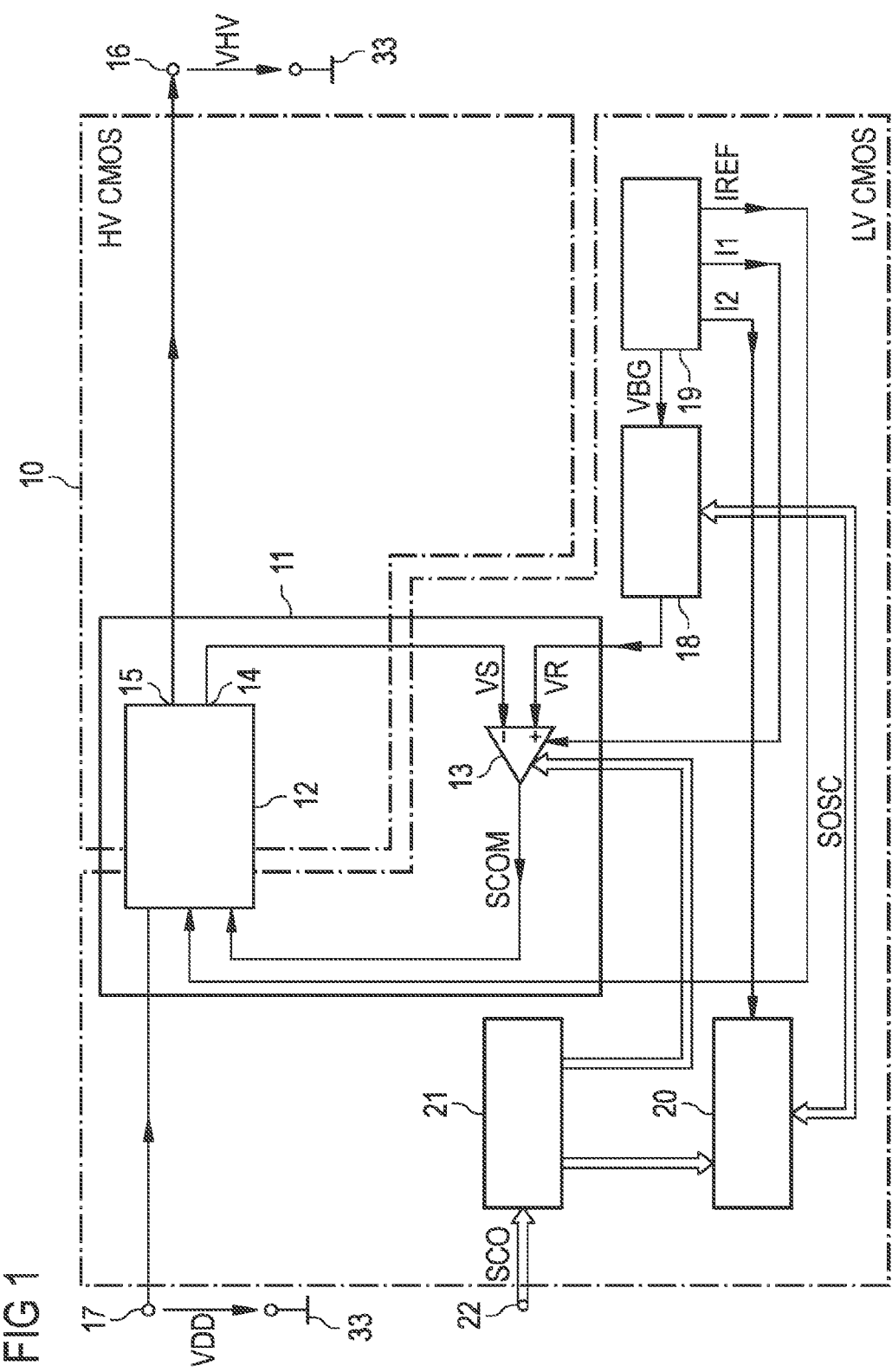

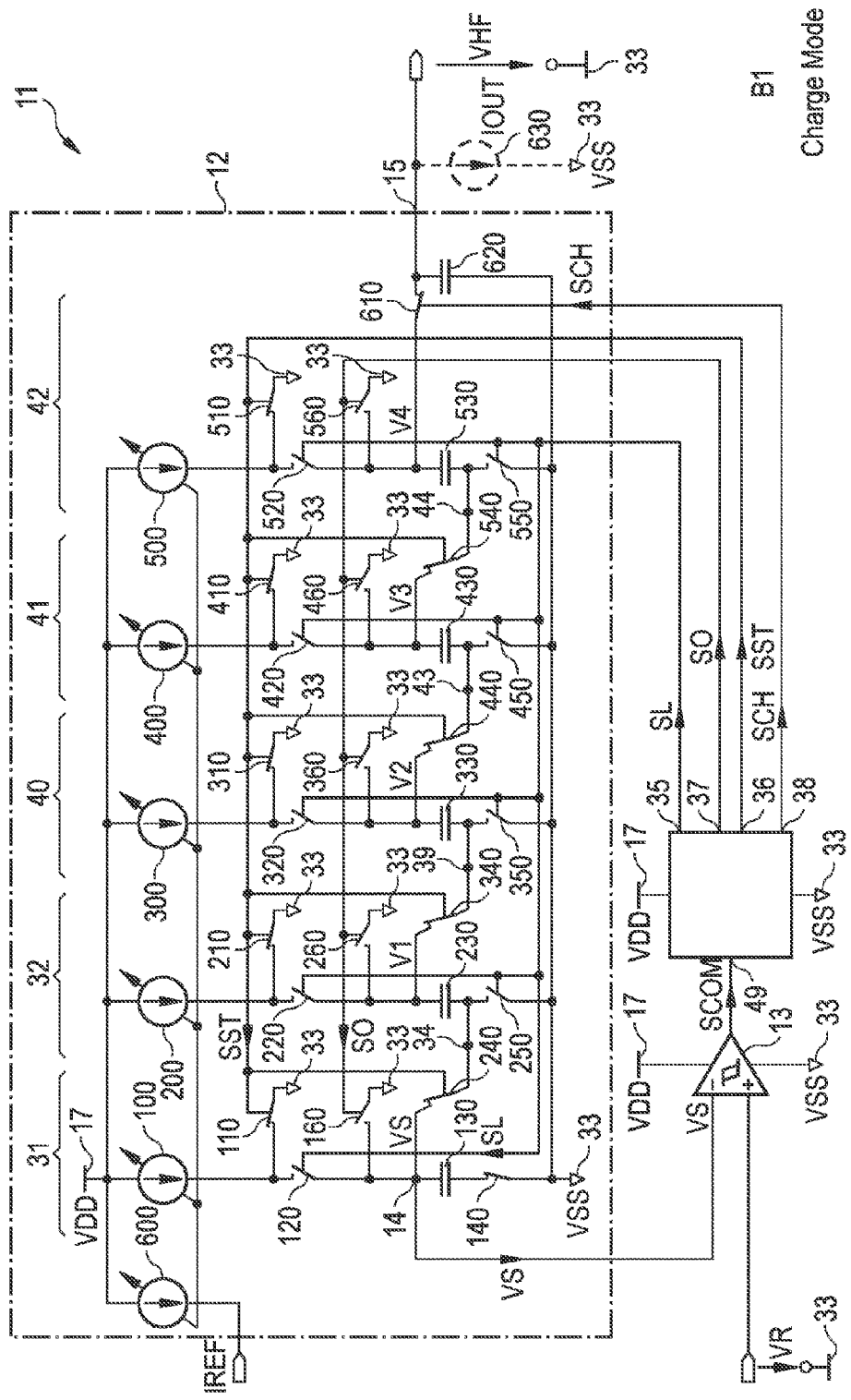

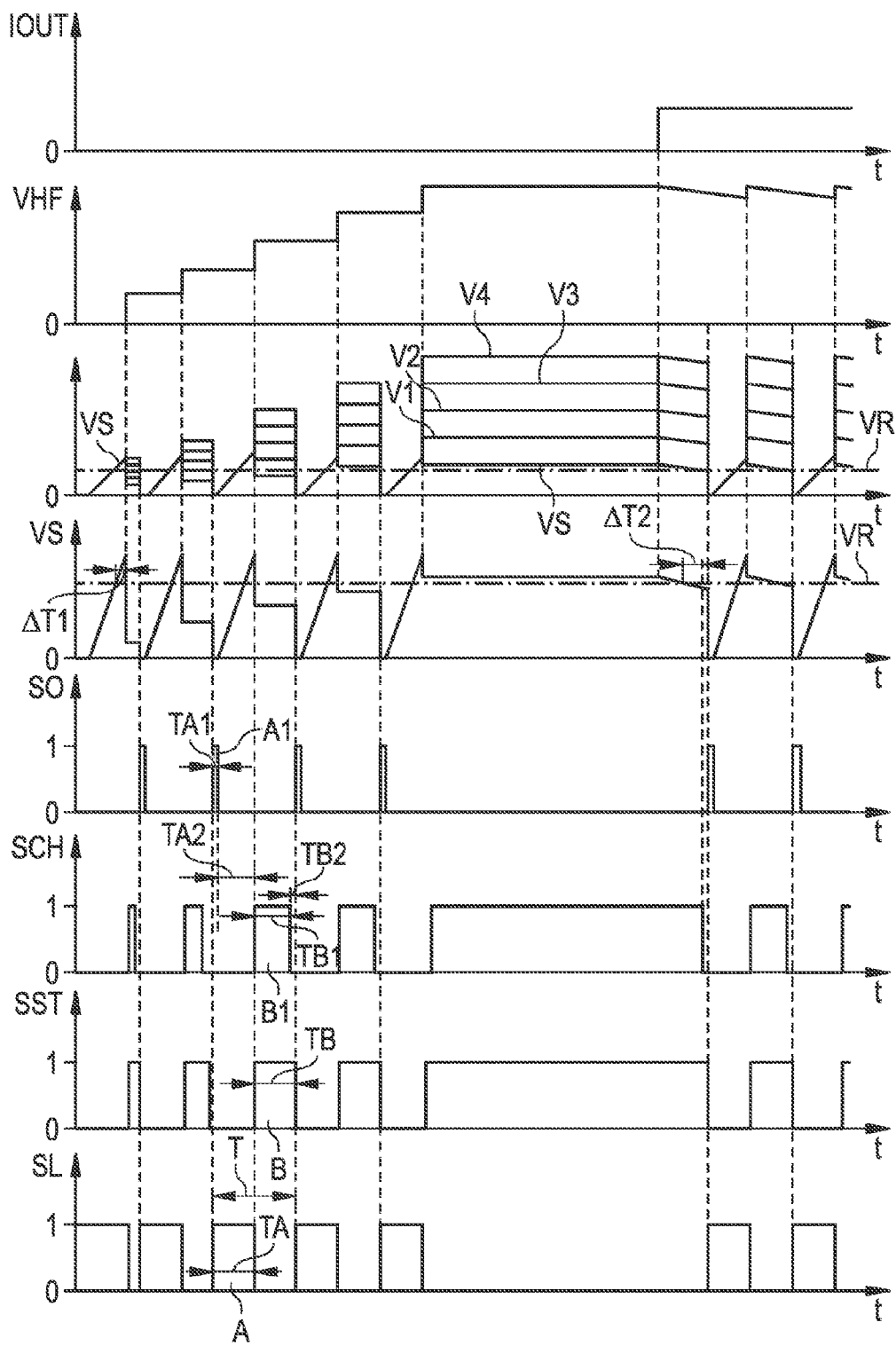

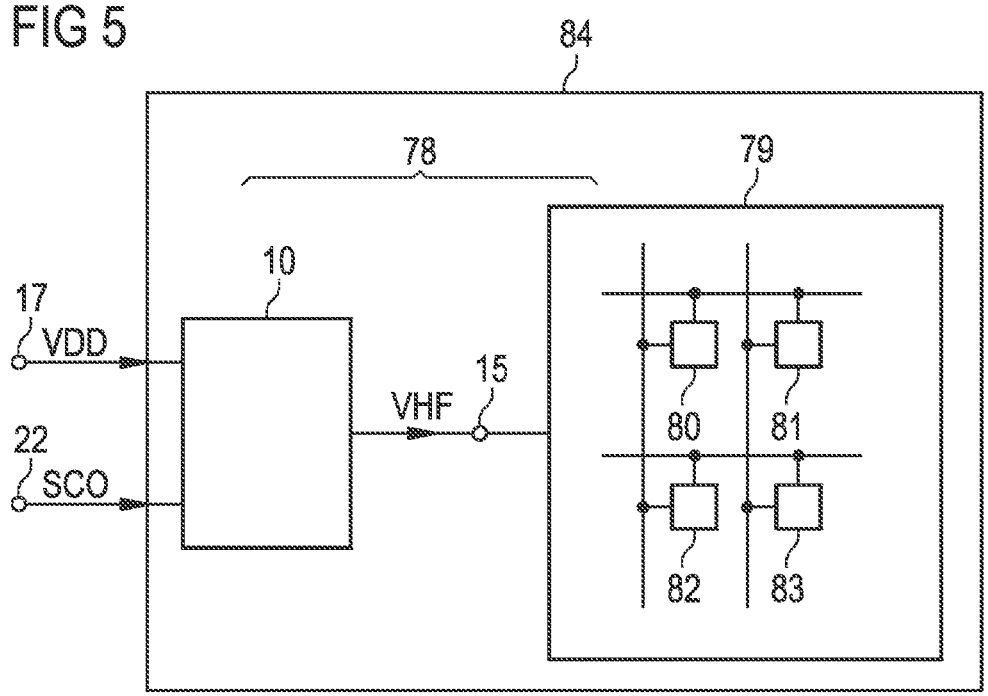
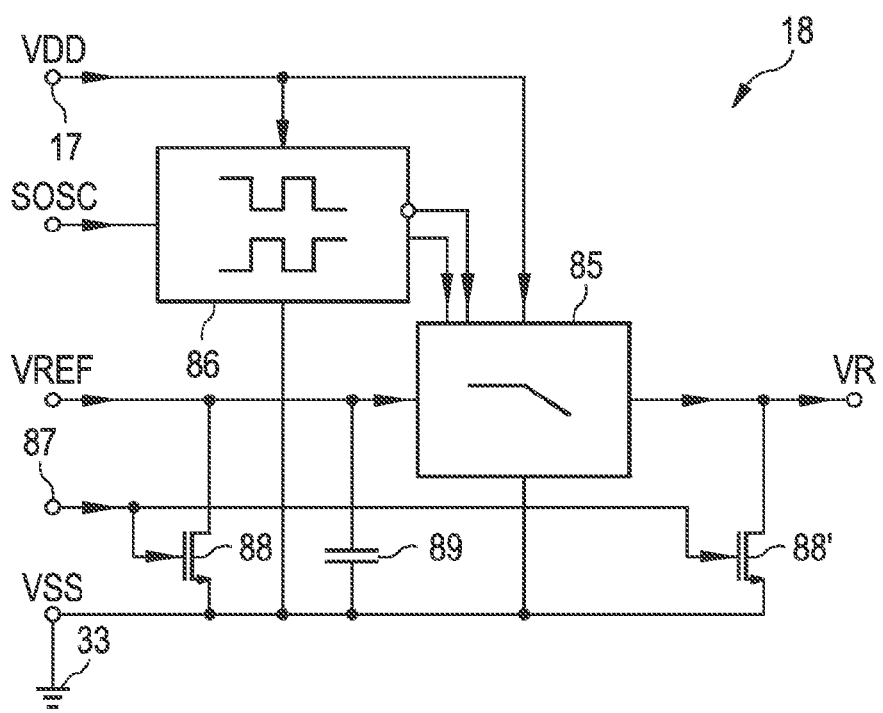

CHARGE PUMP CIRCUIT AND METHOD FOR GENERATING A SUPPLY VOLTAGE

The present invention relates to a charge pump circuit and a method for generating a supply voltage.

Charge pump circuits may be designed for the supply of memory circuits. Charge pump circuits are especially useful for non-volatile memory circuits. For the programming of memory cells, a high voltage value may be required.

Document EP 1980012 B9 refers to a circuit arrangement for voltage supply. The charge pump is driven by an oscillator.

Documents US 2009/0189681 A1 and US 2010/0264981 A1 are related to charge pumps, wherein a signal provided by the charge pump is used for generating a clock or a phase signal.

It is an object of the present application to provide a charge pump circuit and a method for generating a supply voltage with a high accuracy.

This object is achieved with the subject matter of the independent claims. Embodiments are given in the dependent claims.

In an embodiment, a charge pump circuit comprises a first stage and at least a second stage, each having a capacitor and a current source. The charge pump circuit further comprises a comparator having a first input which is coupled to an electrode of one of the capacitors of the first and the at least second stage, a second input for receiving a reference voltage, and an output for generating a comparator signal. The charge pump circuit is configured such that, in a first phase of operation, the capacitor of the first stage is switched in series to the current source of the first stage for charging the capacitor of the first stage and the capacitor of the second stage is switched in series to the current source of the second stage for charging the capacitor of the second stage. The charge pump circuit is configured such that, in a second phase of operation, the capacitor of the first stage and the capacitor of the second stage are switched in series for providing a supply voltage at an output of the charge pump circuit. The first and the second phase are set depending on the comparator signal.

It is an advantage of the charge pump circuit that each stage comprises a current source such that each of the capacitors is charged by means of a current source. Thus, the charge on each of the capacitors and, consequently, the voltage across each of the capacitors are accurately controlled. A supply voltage is provided with high accuracy by adding the voltages across the capacitors.

In one embodiment, the charge pump circuit operates self-timed. The triggering of the first phase and of the second phase is achieved by components of the charge pump circuit itself such that no separate oscillator is needed. In particular, respective settings or connections for the first and the second phase are at least not directly dependent on an oscillating signal provided from an external clock source.

In one embodiment, the charge pump circuit is implemented as a self-regulated circuit.

In one embodiment, the charge pump circuit operates self-adapting such that its frequency of operation depends on an output current. The output current flows through the output of the charge pump circuit. The frequency rises in case of a rising output current. The frequency is reduced in case of a falling output current. Thus, the frequency depends on a load. The frequency is equal to the inverse of the cycle duration. The cycle duration is the sum of the duration of the first phase and the duration of the second phase. Hence, a switching frequency between the first and the second phase is not directly correlated with any oscillator frequency, but only dependent on an actual load.

In one embodiment, the charge pump circuit operates self-adapting such that its frequency of operation depends on a temperature. The frequency rises with rising temperature and is reduced with falling temperature. The relevant temperature is the temperature of a semiconductor body on which the charge pump circuit is integrated.

In one embodiment, each of the current sources comprises a transistor. The transistor can be realized as a field-effect transistor. The transistor can be implemented as a metal-oxide-semiconductor field-effect transistor. The current sources of the at least two stages form a current mirror. The current sources are controllable such that the currents provided by the current sources rise with rising temperature. Thus, the control terminal of the transistors of the current sources may be connected together.

In one embodiment, each of the switches comprises a transistor. The transistor can be realized as a field-effect transistor. The transistor can be implemented as a metal-oxide-semiconductor field-effect transistor.

In an embodiment, a method for generating a supply voltage comprises that inside in a first stage and at least a second stage of a charge pump circuit which each comprises a capacitor and a current source, in a first phase of operation, the capacitor of the first stage is switched in series to the current source of the first stage for charging the capacitor of the first stage and the capacitor of the second stage is switched in series to the current source of the second stage for charging the capacitor of the second stage. In a second phase of operation, a supply voltage is provided at an output by switching the capacitor of the first stage and the capacitor of the second stage in series.

It is an advantage that each of the capacitors is charged by means of a corresponding current source. Thus, the charging of each of the capacitors is accurately controlled. An influence of fluctuations of an input voltage on the voltages across the capacitors and, therefore, on the supply voltage is reduced.

The charge pump circuit may have the following advantages: No external clock generator or oscillator is required. The supply voltage has not to be monitored. A high voltage divider is not needed. The charge pump circuit can be used at wide ranges of the supply voltage. A range of the supply voltage of for example 1.2 V to 3.6 V is achievable. A constant current consumption from a power supply that provides an input voltage is achieved. No higher voltages as the regulated supply voltage at the output of the charge pump circuit can occur. The voltages inside the stages are smaller than the supply voltage at the output. The charge pump circuit operates with current as input and not with voltage as input.

The following description of figures of exemplary embodiments may further illustrate and explain the invention. In so far as components, circuits or devices correspond to one another in terms of their function in different figures, the description thereof is not repeated for each of the following figures.

FIG. 1 shows an exemplary embodiment of a charge pump arrangement.

FIGS. 2A to 2D show an exemplary embodiment of a charge pump circuit.

FIG. 3 shows an exemplary embodiment of signals of the charge pump circuit.

FIG. 5 shows an exemplary memory arrangement with a charge pump arrangement.

FIGS. 6A and 6B show exemplary embodiments of details of a charge pump arrangement.

Figure 2A:
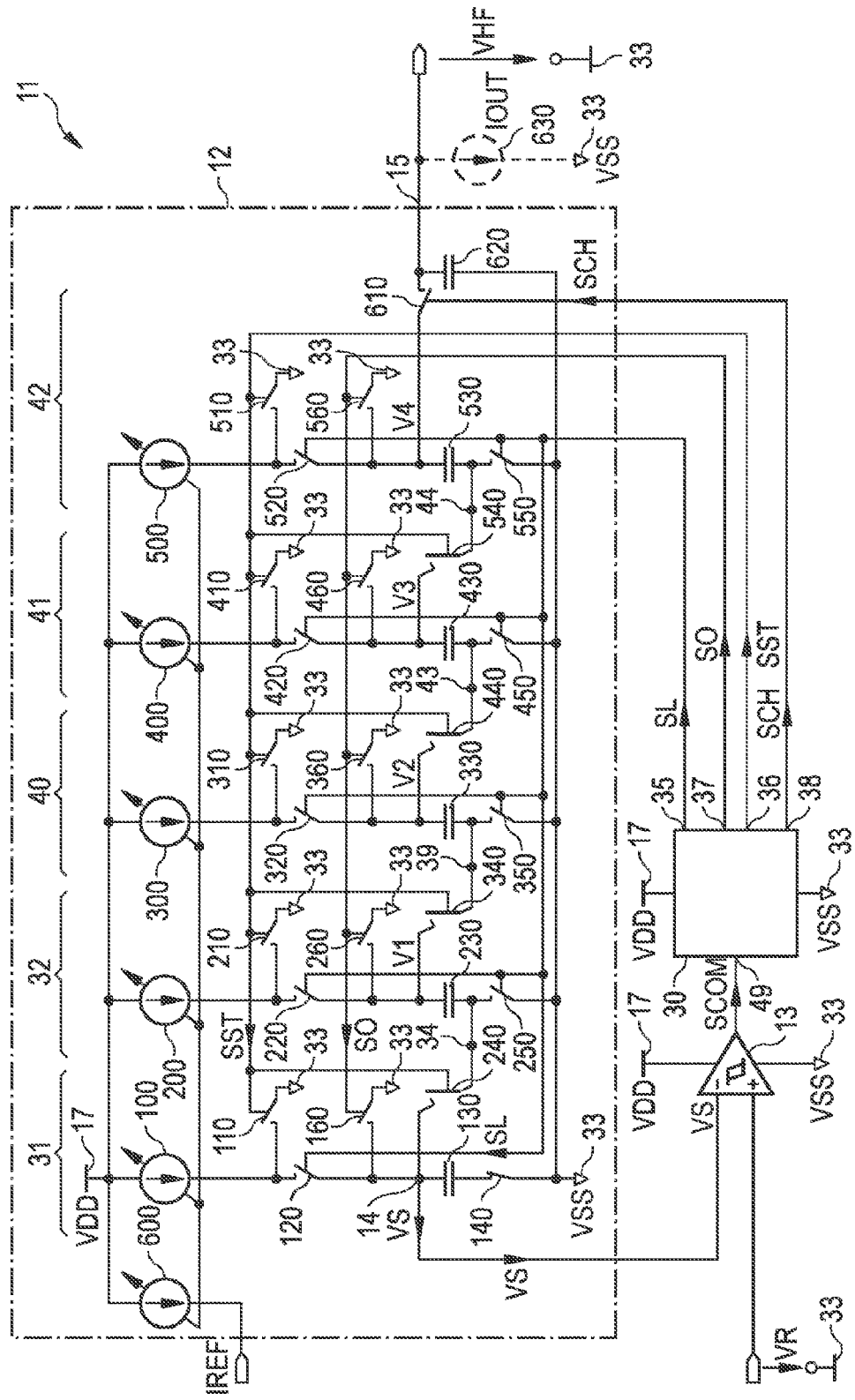

FIG. 1 shows an exemplary embodiment of a charge pump arrangement 10. The charge pump arrangement 10 comprises a charge pump circuit 11 that has a stage arrangement 12 and a comparator 13. An output of the comparator 13 is coupled to an input of the stage arrangement 12. A feedback output 14 of the stage arrangement is coupled to a first input of the comparator 13. An output 15 of the stage arrangement is coupled to a supply output 16 of the charge pump arrangement 10. A supply input 17 of the charge pump arrangement 10 is connected to a further input of the stage arrangement 12.

Moreover, the charge pump arrangement 10 comprises a reference voltage circuit 18 that is connected on its output side to a second input of the comparator 13. The reference voltage circuit 18 is implemented as a ramp circuit or as a ramp rate control circuit. The charge pump arrangement 10 comprises an oscillator 20 that is connected on its output side to the reference voltage circuit 18. The charge pump arrangement 10 comprises a bandgap circuit 19 that is coupled on its output side to the stage arrangement 12. Moreover, the bandgap circuit 19 is connected on its output side to the comparator 13, the reference voltage circuit 18 and the oscillator 20. A control circuit 21 of the charge pump arrangement 10 is connected on its output side to the comparator 13 and to the oscillator 20. A signal input 22 of the charge pump arrangement 10 is connected to the control circuit 21.

An input voltage VDD is applied via the supply input 17 to the stage arrangement 12. The stage arrangement 12 generates a supply voltage VHF at the supply output 16. A feedback voltage VS is generated at the feedback output 14 of the stage arrangement 12 and is provided to the first input of the comparator 13. A comparator signal SCOM is tapped at the output of the comparator 13. The comparator signal SCOM is applied to the input of the stage arrangement 12. The reference voltage circuit 18 generates a reference voltage VR that is supplied to the second input of the comparator 13. The bandgap circuit 19 generates a bandgap voltage VBG that is provided to the reference voltage circuit 18. A reference current IREF of the bandgap circuit 19 is provided to the input of the stage arrangement 12. A first reference current I1 of the bandgap circuit 19 is applied to the comparator 13. A second reference current I2 of the bandgap circuit 19 is applied to the oscillator 20. The oscillator 20 is realized as a ramp rate control oscillator. The bandgap circuit 19 is fabricated as a bandgap reference. The oscillator 20 generates an oscillator signal SOSC that is supplied to the reference voltage circuit 18. A control signal SCO is provided via the signal input 22 to the control circuit 21.

The control signal SCO activates the charge pump arrangement 10. For this purpose, the control signal SCO is fed to the control circuit 21 which activates the comparator 13 and the oscillator 20. When the oscillator 20 generates the oscillator signal SOSC for the reference voltage circuit 18, the reference voltage circuit 18 starts to provide the reference voltage VR. The reference voltage VR is implemented as a ramp. The comparator 13 compares the feedback voltage VS and the reference voltage VR and generates the comparator signal SCOM depending on a comparison of the feedback voltage VS and the reference voltage VR. The operation of the stage arrangement 12 is controlled by the comparator signal SCOM. A cycle of phases of operation of the stage arrangement 12 is started depending on the comparator signal SCOM. If the feedback voltage VS is smaller than the reference voltage VR, the next cycle of phases is started. The charge pump arrangement 10 is free of a connection between the oscillator 20 and the charge pump circuit 11. The pump charge circuit 11 is implemented as high voltage CMOS circuit. The comparator 13, the reference voltage circuit 18, the bandgap circuit 19, the oscillator 20 and the control circuit 21 are fabricated as low voltage CMOS circuits.

FIG. 2A shows an exemplary embodiment of the charge pump circuit 11. The charge pump circuit 11 comprises a waveform generator 30 that couples the output of the comparator 13 to inputs of the stage arrangement 12. The comparator 13 obtains a hysteresis. The comparator 13 is implemented as a Schmitt-trigger circuit. The comparator 13 is designed as a non-inverting Schmitt-trigger circuit. The waveform generator 30 is realized as a non-overlapping waveform generator. A waveform generator input 49 of the waveform generator is connected to the output of the comparator 13. The stage arrangement 12 comprises a first and a second stage 31, 32. The first stage 31 comprises a capacitor 130 and a current source 100 that are coupled in series. A first current path comprises the current source 100 and the capacitor 130 and is connected between the supply input 17 and a reference potential terminal 33. The first stage 31 comprises a first switch 120 that is arranged between the current source 100 and a first electrode of the capacitor 130. Moreover, the first stage 31 comprises a second switch 240 that is arranged between the first electrode of the capacitor 130 and an output 34 of the first stage 31. The first stage 31 comprises an additional switch 160 that couples a node between the first electrode of the capacitor 130 and the first switch 120 to the reference potential terminal 33.

Furthermore, the first stage 31 comprises a further switch 140 that couples a second electrode of the capacitor 130 to the reference potential terminal 33. The further switch 140 of the first stage 31 is permanently in a closed position. The further switch 140 is a replica of a further switch in the following stages to achieve equal conditions in the different stages 31, 32. Moreover, the first stage 31 comprises a source switch 110 that couples a node between the first switch 120 and the current source 100 to the reference potential terminal 33.

A first output 35 of the waveform generator 30 is connected to a control input of the first switch 120. A second output 36 of the waveform generator 30 is connected to the control terminal of the second switch 240 and the source switch 110. An additional output 37 of the waveform generator 30 is connected to a control terminal of the additional switch 160.

Correspondingly, the second stage 32 of the stage arrangement 12 also comprises a current source 200 and a capacitor 230 which are arranged in a current path between the supply input 17 and the reference potential terminal 33. A first switch 220 of the second stage 32 couples the current source 200 of the second stage 32 to a first electrode of the capacitor 230 of the second stage 32. A second switch 340 of the second stage 32 couples the first electrode of the capacitor 230 of the second stage 32 to an output 39 of the second stage 32. An additional switch 260 of the second stage 32 couples the first electrode of the capacitor 230 of the second stage 32 to the reference potential terminal 33. A source switch 210 of the second stage 32 couples a node between the first switch 220 of the second stage 32 and the current source 200 of the second stage 32 to the reference potential terminal 33. A further switch 250 of the second stage 32 couples a second electrode of the capacitor 230 of the second stage 32 to the reference potential terminal 33.

The output 34 of the first stage 31 is connected to the second electrode of the capacitor 230 of the second stage 32. Therefore, the output 34 of the first stage 31 is connected to a node between the capacitor 230 of the second stage 32 and the further switch 250 of the second stage 32.

The stage arrangement 12 comprises a third, a fourth and a last stage 40, 41, 42 that are realized similar as the second stage 32. The last stage 42 is a fifth stage. Thus, the third stage 40 comprises a current source 300, a capacitor 330, a first switch 320, a second switch 440, a further switch 350, an additional switch 360 and a source switch 310. The connection of the capacitor 330 with the current source 300 and the switches 310, 320, 350, 360, 440 of the third stage 40 are identical to the connections of the corresponding elements of the second stage 32.

The fourth stage 41 comprises a current source 400, a capacitor 430, a first switch 420, a second switch 540, a further switch 450, an additional switch 460 and a source switch 410. The last stage 42 comprises a current source 500, a capacitor 530, a first switch 520, a second switch 610, a further switch 550, an additional switch 560 and a source switch 510. The second switch 610 of the last stage 42 of the stage arrangement 12 has a control terminal that is connected to a third output 38 of the waveform generator 30.

The outputs 39, 43, 44 of the second, the third and the fourth stage 32, 40, 41, are connected to the second electrode of the capacitors 330, 430, 530 of the corresponding following stages, namely the third, the fourth and the last stage 40, 41, 42. The output 15 of the stage arrangement 12 is the output of the last stage 42. The charge pump circuit 11 comprises an output capacitor 620 which couples the output 15 of the stage arrangement 12 to the reference potential terminal 33. The second switch 610 of the last stage 42 is connected on its output side to the output 15 of the stage arrangement 12.

The first output 35 of the waveform generator 30 is connected to a control terminal of the first switch 120, 220, 320, 420, 520 of each stage 31, 32, 40, 41, 42 and of the further switch 250, 350, 450, 550 of the second to the last stage 32, 40, 41, 42. The second output 36 of the waveform generator 30 is connected to a control terminal of the second switch 240, 340, 440, 540 of the first to the fourth stage 31, 32, 40, 41 and of the source switch 110, 210, 310, 410, 510 of each stage 31, 32, 40, 41, 42. The additional output 37 of the waveform generator 30 is connected to a control terminal of the additional switch 160, 260, 360, 460, 560 of each stage 31, 32, 40, 41, 42.

The current sources 100, 200, 300, 400, 500 of the five stages 31, 32, 40, 41, 42 form a current mirror. The currents which flow through the current sources 100, 200, 300, 400, 500 are equal. The stage arrangement 12 comprises a control current source 600 that is connected to the current sources 100, 200, 300, 400, 500 of the stages 31, 32, 40, 41, 42 for controlling said current sources. The control current source 600 is connected to an output of the bandgap circuit 19. The reference current IREF flows through the control current source 600. Thus, a current that flows through one of the current sources 100, 200, 300, 400, 500 is equal or proportional to the reference current IREF.

A load signal SL is generated by the waveform generator 30 at the first output 35. The waveform generator 30 provides a stack signal SST at the second output 36. A charge signal SCH is tapped at the third output 38 of the waveform generator 30. A short signal SO is generated by the waveform generator 30 at the additional output 37. The load signal SL is provided to the control terminal of the first switch 120, 220, 320, 420, 520 of the five stages 31, 32, 40, 41, 42. Further on, the load signal SL is applied to the control terminals of the further switch 250, 350, 450, 550 of the second to the last stage 32, 40, 41, 42. Moreover, the stack signal SST is applied to the control terminal of the second switch 240, 340, 440, 540 of the first to the fourth stage 31, 32, 40, 41. Thus, the stack signal SST is not applied to the control terminal of the second switch 610 of the last stage 42. The charge signal SCH is provided to the control terminal of the second switch 610 of the last stage 42. The short signal SO is applied to the control terminal of the additional switch 160, 260, 360, 460, 560 of the five stages 31, 32, 40, 41, 42.

In an alternative, not shown embodiment, the further switch 140 of the first stage 31 is omitted. The second electrode of the capacitor 130 of the first stage 31 is permanently and directly connected to the reference potential terminal 33.

In an alternative, not shown embodiment, the stage arrangement 12 comprises only two stages, namely the first and the second stage 31, 32. Thus, the second switch 340 of the second stage 32 couples the first electrode of the capacitor 230 of the second stage 32 to the output 15 of the stage arrangement. The third output 38 of the waveform generator 30 is connected to the control terminal of the second switch 340 of the second stage 32.

In an alternative, not shown embodiment, the stage arrangement 12 comprises a first number N of stages. The first number N is larger or equal than 2. FIG. 2A shows a stage arrangement 12 comprising five stages 31, 32, 40, 41, 42. However, alternative embodiments of the stage arrangement 12 can comprise two, three, four or more than five stages.

Figure 2B:
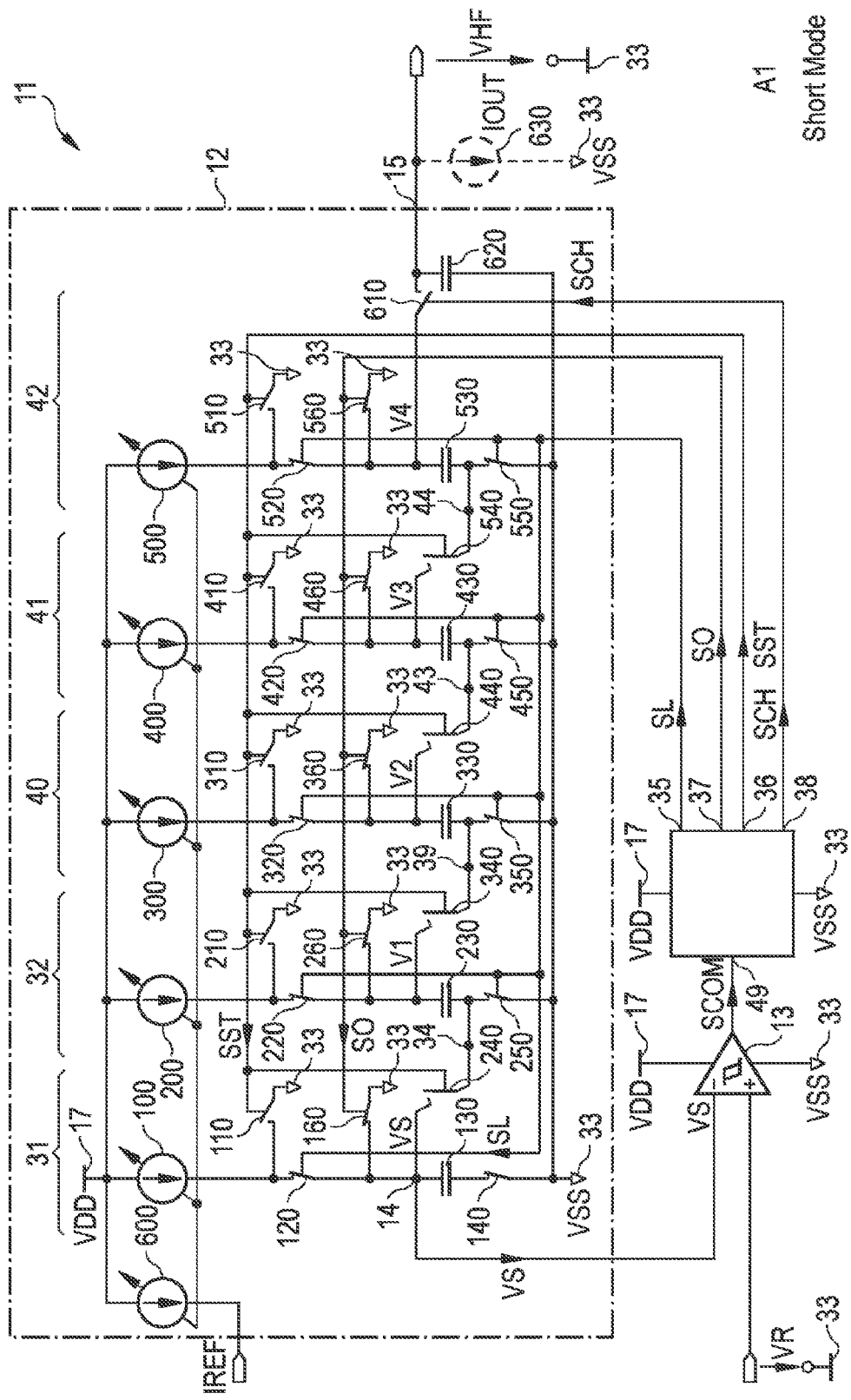
Figure 2C:
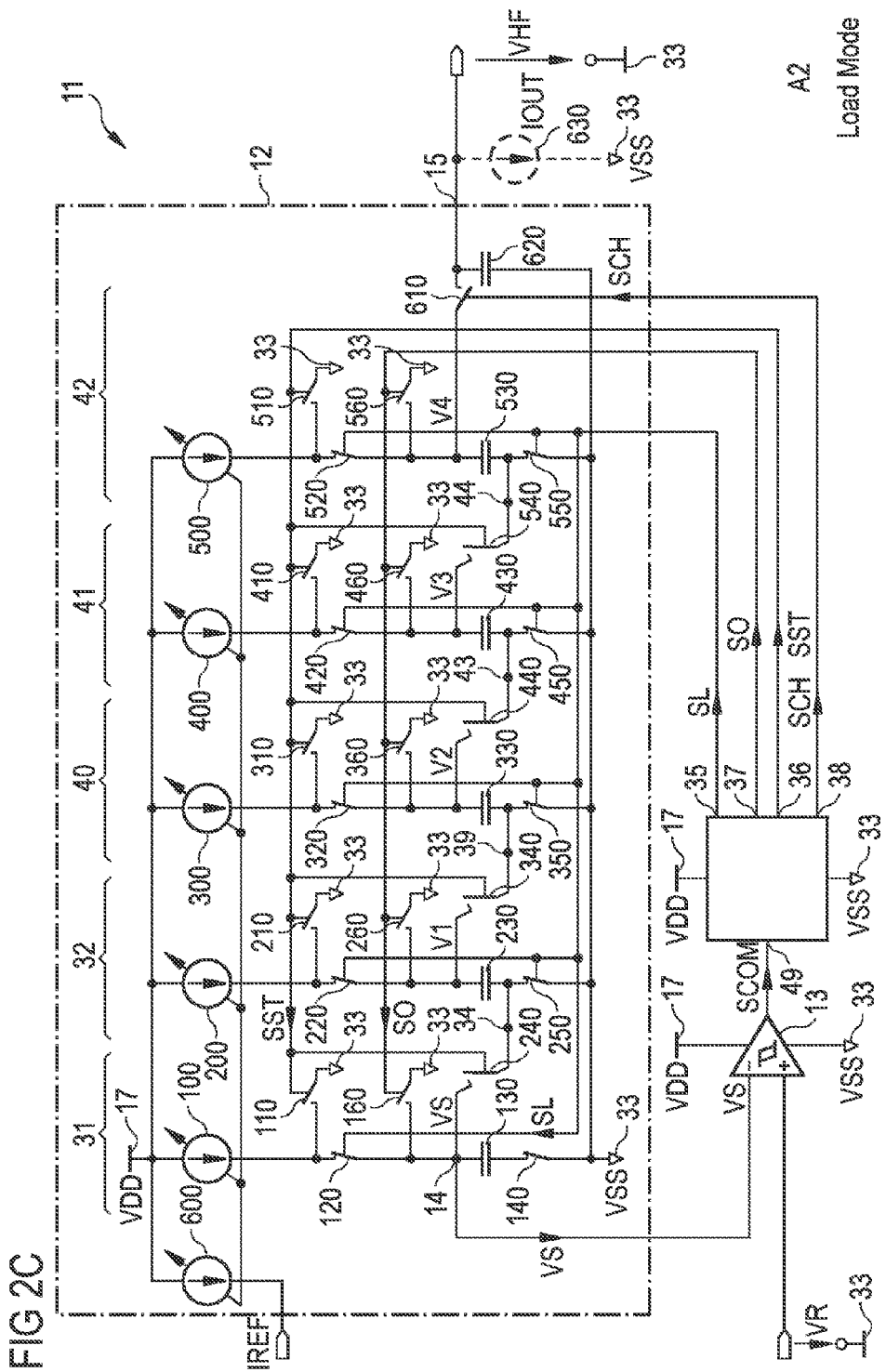

In an alternative, not-shown embodiment, the source switches 110, 210, 310, 410, 510 are removed. Thus, a lower power consumption is achieved. FIGS. 2B, 2C and 2D show the charge pump circuit 11 in different phases of operation. In FIGS. 2B to 2D, the switches are shown in a closed or in an open state depending on the phase, whereas FIG. 2A shows every switch in an open state. A switch in an open state is non-conducting. A switch in a closed state is conducting. The phases and signals are explained in combination with FIG. 3.

FIG. 3 shows exemplary signals of the charge pump circuit 11 as a function of a time t. FIG. 3 shows an output current IOUT that flows through the output 15 of the charge pump circuit 11. The output current IOUT is a load current. Moreover, FIG. 3 shows the supply voltage VHF, the feedback voltage VS at the output 34 of the first stage 31 and the voltages V1, V2, V3, V4 at the outputs 39, 43, 44, 15 of the second to the last stage 32, 40, 41, 42. Moreover, FIG. 3 shows the load signal SL, the stack signal SST, the charge signal SCH and the short signal SO.

A cycle comprises a first phase A of operation and a second phase B of operation. The first phase A of operation is abbreviated as the first phase A and the second phase B of operation is abbreviated as the second phase B. The first phase A is shown in FIGS. 2B and 2C. The second phase B is shown in FIG. 2D. The first phase A comprises a first and a second sub-phase A1, A2. The first sub-phase A1 of the first phase A is named short mode and is shown in FIG. 2B. The second sub-phase A2 of the first phase A is named load mode and is shown in FIG. 2C. Additionally, the second phase B also comprises a first and a second sub-phase B1, B2. The first sub-phase B1 of the second phase B is named charge mode and is shown in FIG. 2D.

The load signal SL has the effect that the first switch 120, 220, 320, 420, 520 of every stage and the further switch 250, 350, 450, 550 of the second to the last stage are in a closed state in the first phase A. The load signal SL has the effect that the first switch 120, 220, 320, 420, 520 of every stage and the further switch 250, 350, 450, 550 of the second to the last stage are in an open state in the second phase B.

The stack signal SST achieves that the second switch 240, 340, 440, 540 of the first to the fourth stage 31, 32, 40, 41 and the source switch 110, 210, 310, 410, 510 of every stage are in an open state during the first phase A. The stack signal SST is configured such that the second switch 240, 340, 440, 540 of the first to the fourth stage 31, 32, 40, 41 and the source switch 110, 210, 310, 410, 510 of every stage is in a closed state during the second phase B. The load signal SL is approximately an inverted signal of the stack signal SST. To avoid losses, a non-overlapping duration between a pulse of the load signal SL and a pulse of the stack signal ST is foreseen. The first and the further switch are in the opposite state in comparison to the second and the source switch.

The charge signal SCH is generated such that the second switch 610 of the last stage 42 is in a closed state during the first sub-phase B1 of the second phase B and is in an open state during the second sub-phase B2 of the second phase B and during the first phase A. Thus, the charge on the output capacitor 620 is kept constant by opening the second switch 610 in the second sub-phase B2 of the second phase B. A transfer of charge from the output capacitor 620 to the last stage 42 at the transition from the second phase B to the first phase A is avoided.
The short signal SO is generated such that the additional switch 160, 260, 360, 460, 560 of every stage is in a closed state during the first sub-phase A1 of the first phase A and is in an open state during the second sub-phase A2 of the first phase A and during the second phase B.

During the first sub-phase A1 of the first phase A, the capacitor 130, 230, 330, 430, 530 of each stage is short circuited that means that the first electrode and the second electrode of the capacitor of each stage is connected to the reference potential terminal 33 via the further switch 250, 350, 450, 550 and the additional switch 160, 260, 360, 460, 560. The first sub-phase A1 of the first phase A increases the stability and accuracy of the generation of the supply voltage VHF. Since the additional switch 160, 260, 360, 460, 560 is open in the second sub-phase A2 of the first phase A, the current provided by the current source 100, 200, 300, 400, 500 charges the capacitor 130, 230, 330, 430, 530 of the corresponding stage in the second sub-phase A2 of the first phase A. Thus in every stage, the capacitor 130, 230, 330, 430, 530 is charged during the second sub-phase A2 of the first phase A.

In the first sub-phase B1 of the second phase B, the capacitors 130, 230, 330, 430, 530 of the five stages are switched in series. The series connection of the capacitors 130, 230, 330, 430, 530 of the stages is arranged between the reference potential terminal 33 and the output 15 of the last stage 42 which is connected to the supply output 16. In the first sub-phase B1 of the second phase B, the output capacitor 620 is charged by means of the series arrangement of the capacitors 130, 230, 330, 430, 530 of the five stages. In the second sub-phase B2 of the second phase B, the second switch 610 of the last stage 42 is set in an open state by the charge signal SCH. Thus, the output capacitor 620 is disconnected in the second sub-phase B2 of the second phase from the five stages.

A cycle duration T of the cycle comprising the first and the second phase A, B can be calculated according to the following equations:

$$T=TA+TB;\ TA=TA1+TA2;\ TB=TB1+TB2;$$

whereas TA is a duration of the first phase A, TB is a duration of the second phase B, TA1 is a duration of the first sub-phase A1 of the first phase A, TA2 is a duration of the second sub-phase A2 of the first phase A, TB1 is a duration of the first sub-phase B1 of the second phase B and TB2 is a duration of the second sub-phase B2 of the second phase B. The duration TA1 of the first sub-phase A1 of the first phase A is constant. The duration TA1 of the first sub-phase A1 of the first phase A is smaller than the duration TA2 of the second sub-phase A2 of the first phase A. The duration TB2 of the second sub-phase B2 of the second phase B is constant. The duration TB2 of the second sub-phase B2 of the second phase B is smaller than the duration TB1 of the first sub-phase B1 of the second phase B. The cycle duration T is regulated and is not constant.

The feedback voltage VS is used to control the duration TA, TB of at least one phase of a group comprising the first and the second phase A, B. The duration TA2 of the second sub-phase A2 of the first phase A and the duration TB1 of the first sub-phase B1 of the second phase B are controlled by means of the feedback voltage VS and the comparator 13. The feedback voltage VS is tapped across the capacitor 130 of the first stage 31. The feedback voltage VS is provided at the first electrode of the capacitor 130 of the first stage 31. The feedback voltage VS rises during the second sub-phase A2 of the first phase A, since the current source 100 charges the capacitor 130. Since the current source 100 provides a constant current to the capacitor 130, the feedback voltage VS raises linearly during the second sub-phase A2 of the first phase A. When the feedback voltage VS is larger than the reference voltage VR, the comparator 13 generates the comparator signal SCOM such that the charge pump circuit 11 switches from the first phase A to the second phase B. Since the comparator 13 and the waveform generator 30 need a first delay ΔT1 for their operation, the point of time of the switching from the first phase A to the second phase B is delayed by the first delay ΔT1 with respect to the point of time when the feedback voltage VS is equal to the reference voltage VR. The hysteresis of the comparator 13 also contributes to the first delay ΔT1.

As shown in the fifth cycle in FIG. 3, the feedback voltage VS remains larger than the reference voltage VR. This results in a long duration TB1 of the first sub-phase B1 of the second phase B. When the feedback voltage VS falls under the value of the reference voltage VR during the second phase B, the end of the first sub-phase B1 of the second phase B and, therefore, the end of the second phase B is triggered. The end of the first sub-phase B1 of the second phase B is delayed by a second delay ΔT2 with reference to the point of time, when the feedback voltage VS falls under the reference voltage VR.

If the predetermined value of the supply voltage VHF is achieved, the charge pump circuit 11 remains in the second phase B. If a load has to be driven, a leakage current occurs or the charge transferred to the output capacitor 620 is not sufficient, the charge pump circuit 11 switches from the second phase B to the first phase A. The falling of the feedback voltage VS and of the output voltages V1 to V4 in the second phase B in the fifth cycle in FIG. 3 is caused by the step of the output current IOUT flowing through a load current source 630. The first phase A and the second phase B alternate.

An advantage of the charge pump circuit 11 is that an oscillator for providing the supply voltage VHF is part of the charge pump circuit 11 such that no separate oscillator is needed. The control circuit 21 only enables the oscillator 20 of the reference circuit 18 and the comparator 13. The bandgap circuit 19 provides the bandgap voltage VBG to the reference voltage circuit 18 and the reference current IREF as input for the charge pump circuit 11. At the beginning, the capacitors 130, 230, 330, 430, 530 of the charge pump circuit 11 are discharged in the short mode shown in FIG. 2B and then the non-overlapping waveform generator 30 applies the load mode shown in FIG. 2C. The first and the further switches 120, 220, 320, 420, 520, 140, 250, 350, 450, 550 are closed and the source, the additional and the second switches 110, 210, 310, 410, 510, 160, 260, 360, 460, 560, 240, 340, 440, 540, 610 are open in the load mode. The reference current IREF flowing into the terminal of the bandgap circuit 19 is mirrored to the current sources 100, 200, 300, 400, 500. The current sources 100, 200, 300, 400, 500 and the capacitors 130, 230, 330, 430, 530 are forming integrator stages which are loaded until the feedback voltage VS at the feedback output 14 reaches the reference voltage VR. The comparator 13 detects if the feedback voltage VS becomes higher than the reference voltage VR and triggers the change from the load mode to the charge mode shown in FIG. 2D via the non-overlapping waveform generator 30. The capacitors 130, 230, 330, 430, 530 are charged parallel in the load mode and than are arranged in series in the charge mode.

In the charge mode, the first, the further and the additional switches 120, 220, 320, 420, 520, 250, 350, 450, 550, 160, 260, 360, 460, 560 are open and the source and the second switches 110, 210, 310, 410, 510, 240, 340, 440, 540, 610 are closed. The source switches 110, 210, 310, 410, 510 are shorting the current from the current sources 100, 200, 300, 400, 500 to ground 33. The currents of the current sources 100, 200, 300, 400, 500 flow to the reference potential terminal 33 during the second phase B. This features a constant current consumption from the input voltage VDD, when the charge pump arrangement 10 is operating and reduces the noise of the charge pump arrangement 10.

The capacitors 130, 230, 330, 430, 530 are stacked in the charge mode and the charge is transferred into the output capacitor 620. The supply voltage VHF is determined by the first number of stages and the reference voltage VR. Each stage adds the reference voltage VR to the voltage at the output of the preceding stage such that the supply voltage VHF is approximately the product of the first number of stages and the value of the reference voltage VR. The capacitor stack forms also a voltage divider and the feedback voltage VS will stay on the level of the reference voltage VR. Due to switch losses and leakage currents the capacitor stack is discharged continuously. If the feedback voltage VS drops under the level of the reference voltage VR, the comparator 13 triggers via the non-overlapping waveform generator 30 a mode change to the short mode shown in FIG. 2B.

The capacitors 130, 230, 330, 430, 530 are discharged during the first sub-phase A1 of the first phase A. Thus in the short mode, the capacitors 130, 230, 330, 430, 530 are self-timed completely discharged and the load mode is started automatically, when the discharge is finished. Discharging the capacitors 130, 230, 330, 430, 530 results in stable voltage conditions on the capacitor stack depending only on the mismatch of the capacitors 130, 230, 330, 430, 530. A regulation loop comprises the first stage 31, the comparator 13 and the waveform generator 30. The integrator stages 31, 32, 40, 41, 42 and the regulation loop are forming a current-capacitor oscillator, abbreviated IC oscillator. The stages 31, 32, 40, 41, 42, the comparator 13 and the waveform generator 30 form the oscillator. The oscillator is part of the charge pump circuit 11. Since the voltage divider is integrated in the charge pump circuit 11 and is realized by the capacitor stack, no dc current is flowing for generating the feedback voltage VS.

The charge pump circuit 11 is self-timed. If the charge pump circuit 11 has to deliver more output current IOUT that is a load current e.g. in case of high temperature, the charge pump circuit 11 switches faster between load-mode and charge-mode. The maximum frequency depends on the reference current IREF, the size of the capacitors 130, 230, 330, 430, 530, the hysteresis and the propagation delay of the comparator 13 and the other circuit parts and the duration TA1 of the short-mode. The highest voltage in the charge pump circuit 11 is always at the top of the capacitor stack that means at the output 15. Advantageously, there is no possibility to produce a higher voltage in the charge pump circuit 11. The first number of stages 31, 32, 40, 41, 42 depends only on the reference voltage VR and is independent of the input voltage VDD. Forcing the reference current IREF to pump can be achieved with less effort compared to forcing a reference voltage on the supply input 17 and can be achieved without additional circuitry. FIG. 3 shows the timing and voltage conditions during start-up and pulling the output current IOUT out of the charge pump circuit 11.

The capacitor 130 of the first stage 31 and the capacitor 230 of the second stage 32 can advantageously be stacked. The self-timing depends on the value of the output current IOUT at the output 15. The time constant given by the value of the current through the current source 100 and the value of the capacitor 130, abbreviated IC time constant, is variable and depends on the load. If no energy is consumed from the energy stored in the output capacitor 620, no switching occurs after a successful loading to the predetermined level of the supply voltage VHF. The charge pump circuit 11 operates using a frequency f that depends on the output current IOUT. The frequency f is equal to the inverse of the cycle duration t, such that f=1/T.

The charge pump circuit 11 is a low power circuit and is temperature compensated. The capacitive voltage divider avoids a loss by a DC current flowing through a resistive voltage divider. Thus, the charge pump circuit 11 has to deliver a smaller current. The pump oscillator output frequency is a function of the load at the output 15. The maximum output frequency has not to be designed for the worst case condition and is self-adapting. To compensate temperature effects of the output current IOUT, the charge pump circuit 11 is designed to run at higher temperature with higher frequency f. The charge pump circuit 11 can operate at a wide range of the input voltage VDD e.g. 1.2V to 3.6V. The needed number of pump stages is directly related to the supply voltage VHF. The worst case is the smallest input voltage VDD e.g. 1.2V: The number of pump stages can be designed for this condition. The needed number of stages is directly related to the supply voltage VHF and the reference voltage VR and is independent of the input voltage VDD. The charge pump circuit 11 compensates this by reducing the frequency of operation thus achieving high efficiency. Also in case the charge pump circuit 11 has to deliver a high output current IOUT at a supply voltage VHF of for example 13.5V, it is avoided that the voltages V1, V2, V3, V4 are higher than the supply voltage VHF. Thus, oxide damages of the pump capacitors 130, 230, 330, 430, 530 can be avoided.

In an alternative, not-shown embodiment, the control terminal of the second switch 610 of the last stage 42 is connected to the second output 36 of the waveform generator 30 and is fed with the stack signal SST. Thus, the second sub-phase B2 of the second phase B is omitted.

Figure 4:
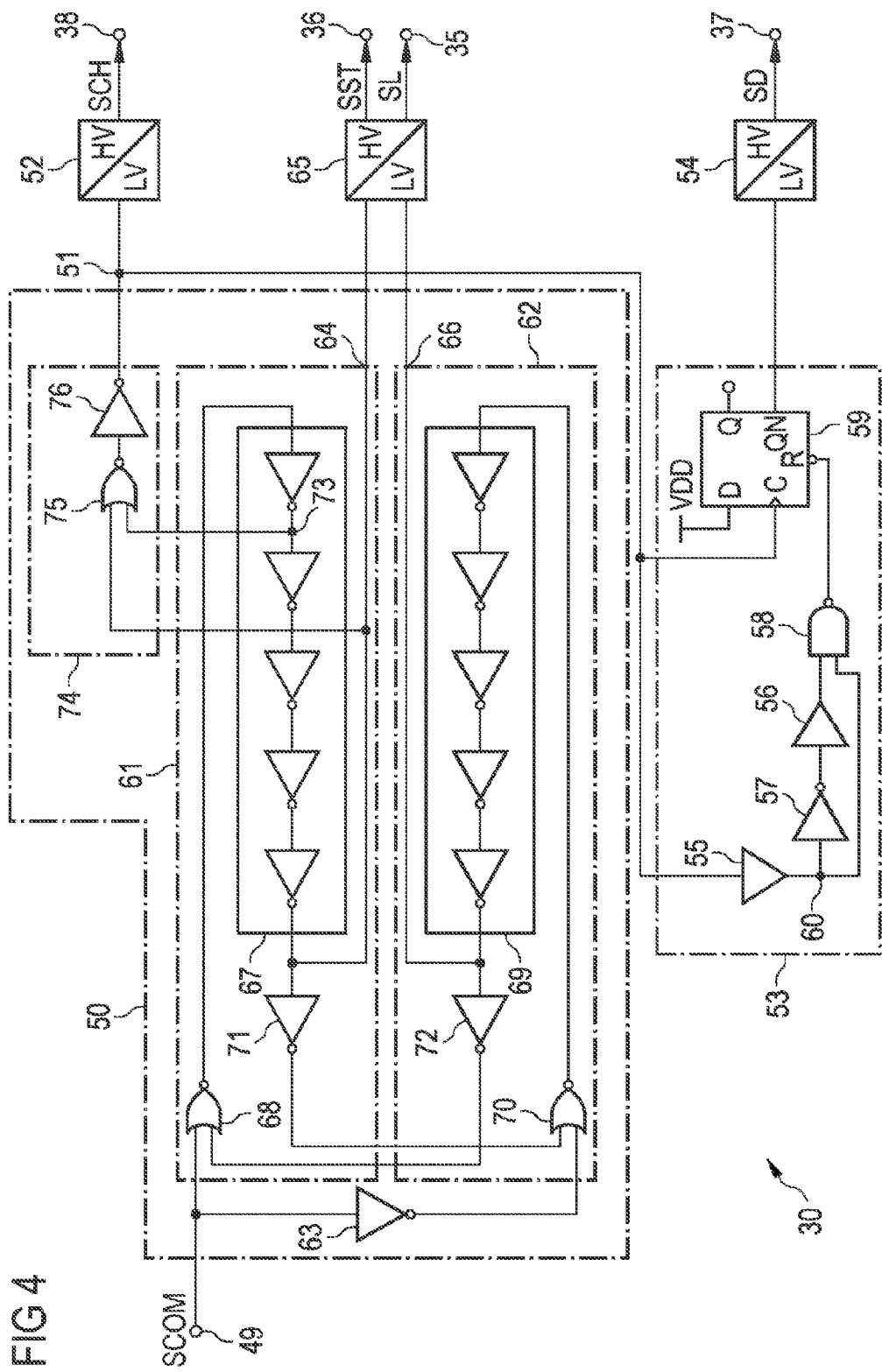
FIG. 4 shows an exemplary embodiment of a waveform generator.

FIG. 4 shows an exemplary embodiment of the waveform generator 30. The waveform generator input 49 of the waveform generator 30 is coupled to the output of the comparator 13. The first, second and third output 35, 36, 38 and the additional output 37 of the waveform generator 30 are connected to the stage arrangement 12. The waveform generator 30 comprises a first logical circuit 50 which is connected on its input side to the waveform generator input 49 of the waveform generator 30 and has an output 51. The output 51 of the first logical circuit 50 is coupled to the third output 38 of the waveform generator 30 via a first level shifter 52. Moreover, the waveform generator 30 comprises a second logical circuit 53 which is connected on its input side to the output 51 of the first logical circuit 50. On the output side the second logical circuit 53 is coupled to the additional output 37 of the waveform generator 30 via a second level shifter 54.

The second logical circuit 53 comprises a delay circuit 55, a further delay circuit 56, an inverter 57, a NAND gate 58 and a flip-flop 59 that is realized as a D-flip-flop. The second logical circuit 53 causes a delay of a signal which can be tapped off at the output 51 of the first logical circuit 50. The output 51 of the first logical circuit 50 is coupled via the delay circuit 55 to a node 60. The node 60 is directly connected to a first input of the NAND gate 58 and is coupled via the inverter 57 and the further delay circuit 56 to a second input of the NAND gate 58. Thus, a signal at the output of the NAND gate 58 has the logical value 1 for most of the time and the logical value 0 for a short time which is defined by a delay time caused by the inverter 57 and the further delay circuit 56. The output of the NAND gate 58 is connected to a reset input of the flip-flop 59. The output 51 of the first logic circuit 51 is connected to a clock input of the flip-flop 59. A data input of the flip-flop 59 is permanently connected to the supply input 17 and thus receives the logical value 1. An inverted output of the flip-flop 59 is connected via the second level shifter 54 to the additional output 57. The duration TA1 of the short signal SO is defined by the delay caused by the inverter 57 and the second delay circuit 56. The waveform generator 30 is configured to provide the short signal SO having a pulse with the constant duration TA1.

The first logic circuit 50 comprises a first and a second sub-circuit 61, 62 as well as an inverter 63. The first sub-circuit 61 is directly connected to the waveform generator input 49 of the waveform generator 30. Contrary to that the second sub-circuit 62 is coupled via the inverter 63 to the waveform generator input 49 of the waveform generator 30. A first terminal 64 of the first sub-circuit 61 is connected via a third level shifter 65 to the second output 36. A second terminal 66 of the second sub-circuit 62 is coupled via the third level shifter 65 to the first output 35. The third level shifter 65 is implemented such that a signal path between the first terminal 64 and the second output 36 and a signal path between the second terminal 66 and the first output 35 are not coupled to each other and do not influence each other. The level shifters 52, 54 65 are configured to operate at low voltages on the input side and at high voltages at the output side.

The inverter 63 has the effect that the stack signal SST is an inverted signal to the load signal SL. The first sub-circuit 61 comprises a first inverter chain 67 which is connected on its output side to the first terminal 64. The waveform generator input 49 is coupled to an input of the first inverter chain 67 via a first NOR gate 68. The first inverter chain 67 comprises five inverters. Similarly, the second sub-circuit 62 comprises a second inverter chain 69. The second inverter chain 69 comprises five inverters. The second inverter chain 69 is connected on its output side to the second terminal 66. The output of the inverter 63 is coupled to the input of the second inverter chain 69 via a second NOR gate 70. The output of the first inverter chain 67 is coupled via an inverter 71 to a further input of the second NOR gate 70. The output of the second inverter chain 69 is coupled via an inverter 72 to a further input of the first NOR gate 68. Thus, the first sub-circuit 61 receives the signal of the second sub-circuit 62 and vice versa.

The first terminal 64 and a node 73 in the first inverter chain 67 are connected to two inputs of a third sub-circuit 74 of the first logical circuit 50. The third sub-circuit 74 is connected on its output side to the output 51 of the first logical circuit 50. The third sub-circuit 74 comprises a NOR gate 75 which is coupled via an inverter 76 to the output 51. The node 73 is arranged between the first and the second inverter of the first inverter chain 67. The two inputs of the NOR gate 75 receive signals tapped at the node 73 and the first terminal 64. The duration TB2 of the second sub-phase B2 of the second phase B is defined by inverters comprised by the first inverter chain 67 and the third sub-circuit 74. The first inverter chain 67 and the third sub-circuit 74 have the effect that a pulse of the charge signal SCH ends before a pulse of the stack signal SST ends. Thus, the duration TB2 of the second sub-phase of the second phase B is defined by the waveform generator 30, since a delay caused by four inverters of the first delay chains 67 has a larger value in comparison to a delay caused by the NOR gate 75 and the inverter 76 of the third sub-circuit 74.

The waveform generator 30 triggers the transition from the first phase A to the second phase B in case of a change of the logical value of the comparator signal SCOM. The waveform generator 30 triggers the transition from the second phase B to the first phase A in case of a reverse change of the logical value of the comparator signal SCOM. The waveform generator 30 realizes the first sub-phase A1 of the first phase A with the constant duration TA1. The waveform generator 30 realizes the second sub-phase B2 of the second phase B with the constant duration TB2.

The switches in the stage arrangement 12 are implemented as high voltage transistors. Such transistors can withstand a high voltage at all terminals such as source, drain, gate and bulk. The level shifter 52, 54, 65 can drive such transistors.

In an alternative embodiment, the switches in the stage arrangement 12 are implemented as asymmetric high voltage transistors. Such transistors can withstand a high voltage at the source, the drain and the bulk and only a low voltage at the gate. Thus, the level shifters 52, 54, 65 are only required in case PMOS high voltage transistors are used for the switches such as the second switches 240, 340, 440, 540, 610.

In an alternative, not-shown embodiment, the third level shifter 65 is replaced by two level shifters, whereas one level shifter couples the first terminal 64 of the first sub-circuit 67 to the second output 36 of the waveform generator 30 and another level shifter couples the second terminal 66 of the second sub-circuit 69 to the first output 35 of the waveform generator 30.

FIG. 5 shows an exemplary memory arrangement 78. The memory arrangement 78 comprises the charge pump arrangement 10 and a memory 79 with at least a memory cell 80 to 83.

The charge pump arrangement 10 is integrated on a semiconductor body 84. The capacitors 130, 230, 330, 430, 530 are also realized on the semiconductor body 84. The memory arrangement 78 is integrated on the semiconductor body 84. A single semiconductor body 84 comprises the memory arrangement 78. The memory 79 is fabricated by a CMOS non-volatile memory process. CMOS is the abbreviation for complementary metal oxide semiconductor. To program and erase non-volatile memory bit cells 80 to 83, a high voltage is needed. The value of the needed supply voltage VHF depends on the chosen programming mechanism to get electrons on the floating gate. The voltage may be for example in the range of 12 volts to 15 volts. The program and erase time and the reliability of the bit cells 80 to 83 strongly depend on the variation of the high voltage used for programming or erasing bit cells. To be within a specified program and erase time the supply voltage VHF of the charge pump circuit 11 should not vary by more than 1 V. The chosen maximum output voltage of the charge pump circuit 11 is preferably far below the maximum ratings of the bit cells 80 to 83 and the high voltage transistors used in the process to design a non-volatile memory 79. At higher temperature, 125 degree Celsius and more, the leakage of CMOS circuits increases dramatically. The charge pump circuit 11 is able to deliver enough current at high temperature for proper write operations. For battery applications it is important that during the write operation the power consumption is as low as possible. The charge pump arrangement 10 takes care of the topics shown above. To keep the variation of the supply voltage VHF as small as possible, the supply voltage VHF is regulated. To allow high temperature write operations, the charge pump circuit 11 must deliver more current at higher temperatures. Therefore, the charge pump circuit 11 is self-regulated and runs faster, if more output current IOUT is needed.

In terms of reliability, the endurance performance of a non-volatile memory 79 is also depending on the ramp rate of the supply voltage VHF. The faster the supply voltage VHF provided by the charge pump circuit 11 reaches its maximum value the more stress the tunnel oxide of the memory cells 80 to 83 gets, which is the most important parameter in terms of endurance reliability.

It is advantageous for EEPROM or FLASH applications that the reference circuit 18 is implemented as a ramp rate control circuit. A constant current consumption during write operation is advantageous for applications like radio-frequency identification, abbreviated RFID, for security reasons.

FIG. 6A shows an exemplary embodiment of the reference voltage circuit 18. The reference voltage circuit 18 is designed as a ramp generator. The reference voltage circuit 18 comprises a low-pass filter 85. The low-pass filter 85 is implemented as a switched capacitor circuit. A signal generator 86 of the reference voltage circuit 18 is connected on its input side to the oscillator 20. A first and a second output of the signal generator 86 is connected to a first and a second input of the low-pass filter 85. An input of the low-pass filter 85 is connected to the output of the bandgap circuit 19. An output of the low-pass filter 85 is connected to the second input of the comparator 13.

A control input 87 of the reference voltage circuit 18 is connected to a control terminal of a transistor 88 and to a control terminal of a further transistor 88'. The control input 87 is connected to an output of the control circuit 21. The transistor 88 couples the input of the low-pass filter 85 to the reference potential terminal 33, whereas the further transistor 88' couples the output of the low-pass filter 85 to the reference potential terminal 33. A smoothing capacitor 89 couples the input of the low-pass filter 36 to the reference potential terminal 33. The low-pass filter 36 is additionally connected to the reference potential terminal 33 and to the supply input 17.

The signal generator 86 generates two signals which depend on the oscillator signal SOSC of the oscillator 20, whereas the two signals are provided to the low-pass filter 85. The two signals control the state of the switches in the switched capacitor circuit of the low-pass filter 85. The low-pass filter 85 achieves a low-pass filtering of the bandgap voltage VBG. The low-pass filter 85 provides the reference voltage VR as a filtered signal. If a signal at the control input 87 sets the transistor 88 in a non-conducting state, the bandgap voltage VBG is provided to the low-pass filter 36. The signal at the input of the low-pass filter 36 has a rectangular pulse form. Thus, the reference voltage VR at the output of the low-pass filter 85 obtains the form of a ramp due to the low-pass filtering of the rectangular signal at the input. The transistor 88 and the further transistor 88' are designed to discharge the smoothing capacitor 89 and not-shown capacitors which are comprised by the low-pass filter 85. Thus, the reference voltage VR can be set to 0 V depending on the signal at the control input 87. After such a discharging procedure the low-pass filter 36, and thus the ramp generator 18, provides a rising reference voltage VR. A slope of the reference voltage VR depends on a frequency of the oscillator signal SOSC. Thus, the slope of the reference voltage VR is defined by the oscillator 20.

Figure 6B:
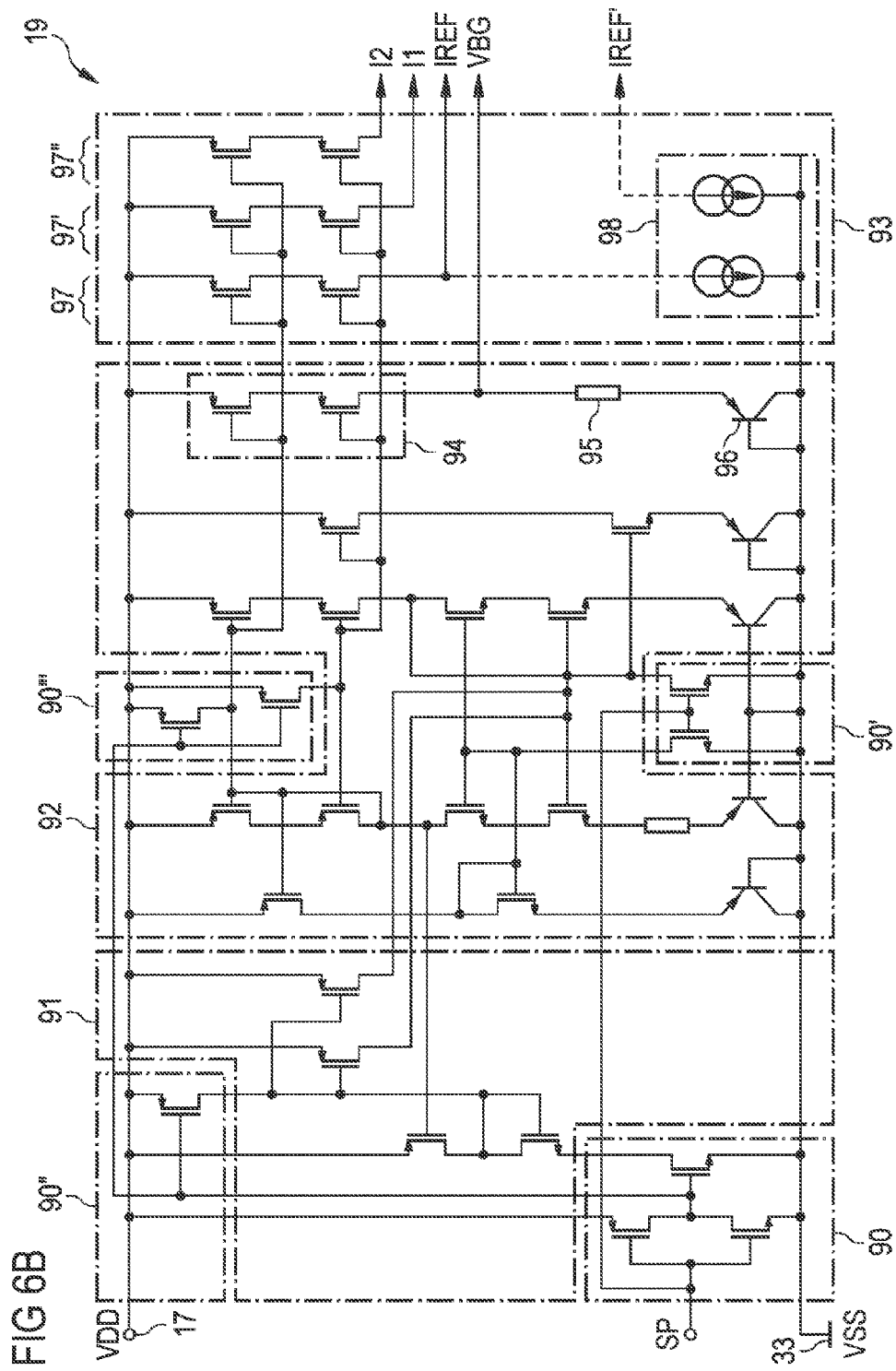

FIG. 6B shows an exemplary embodiment of the bandgap circuit 19. The bandgap circuit 19 comprises a power-down circuit 90, a start-up circuit 91, a bandgap voltage circuit 92 and a current output circuit 93. The bandgap circuit 19 is arranged between the supply input 17 and the reference potential terminal 33. The power-down circuit is divided in sub-circuits 90, 90', 90'', 90''' and is triggered by a power-down signal SP. The bandgap voltage circuit 92 comprises a current path having a current source 94, a resistor 95 and a bipolar transistor 96. The voltage output of the bandgap circuit 19 is connected to a node between the resistor 95 and the current source 94. The bandgap voltage VGB is tapped at the node between the resistor 95 and the current source 94.

The current output circuit 93 comprises three current sources 97, 97', 97''. These three current sources 97, 97', 97'' are connected to the current source 94 of the bandgap voltage circuit 92 forming a current mirror. An output of the current source 97 is connected to the output of the bandgap circuit 19 for providing the reference current IREF. The first and the second reference current I1, I2 are provided at the outputs of the current sources 97', 97''. The reference currents IREF, I1, I2 are proportional to the absolute temperature. The reference currents IREF, I1, I2 have a positive temperature coefficient. Thus, the current sources 100, 200, 300, 400, 500 of the charge pump circuit 11 provide a current with a higher value in case the temperature rises. The temperature coefficient of the current of the current sources 100, 200, 300, 400, 500 of the charge pump circuit 11 is positive. Thus, the cycle duration T decreases with increasing temperature. The value of the bandgap voltage VBG is nearly stable over temperature.

As indicated by the broken lines, the current output circuit 93 optionally comprises a further current mirror 98 that couples the current source 97 to the current source 600 of the charge pump circuit 11. The further current mirror 98 is arranged between the current source 97 and the reference potential terminal 33 and between the current source 600 of the charge pump circuit 11 and the reference potential terminal 33.

The invention claimed is:

1. A charge pump circuit, comprising:
a first stage and an at least second stage, each having a capacitor and a current source, wherein the first stage and the at least second stage each comprise:
a first switch arranged between the current source of the respective stage and a first electrode of the capacitor of the respective stage and set in a closed state in a first phase of operation and in an open state in a second phase of operation;
a second switch arranged between the first electrode of the capacitor of the respective stage and an output of the respective stage and set in an open state in the first phase of operation and in a closed state in the second phase of operation; and
a third switch that couples the first electrode of the capacitor of the respective stage to a reference potential terminal and is set in a closed state in a first sub-phase of the first phase of operation and in an open state in a second sub-phase of the first phase of operation and in the second phase of operation; and
a comparator having:
a first input which is coupled to an electrode of one of the capacitors of the first and the at least second stage,
a second input for receiving a reference voltage, and
an output for generating a comparator signal,
wherein the charge pump circuit is configured such that, in the first phase of operation, the capacitor of the first stage is switched in series to the current source of the first stage for charging the capacitor of the first stage and the capacitor of the second stage is switched in series to the current source of the second stage for charging the capacitor of the second stage and that, in the second phase of operation, the capacitor of the first stage and the capacitor of the second stage are switched in series for providing a supply voltage at an output of the charge pump circuit, and wherein the first and the second phase are set depending on the comparator signal.

2. The charge pump circuit according to claim 1, wherein the first and the second phase are set based on the comparator signal only, without using a signal from an external clock source.

3. The charge pump circuit according to claim 1, wherein an output of the comparator is coupled to a respective control terminal of the first and the second switch.

4. The charge pump circuit according to claim 3, comprising a waveform generator which couples the output of the comparator to the control terminal of the first and the second switch.

5. The charge pump circuit according to claim 4, wherein the waveform generator is implemented to trigger the transition from the first phase to the second phase depending on the comparator signal and to trigger the transition from the second phase to the first phase depending on the comparator signal.

6. The charge pump circuit according to claim 1, wherein the first and the at least second stage each comprising a source switch that couples a node between the current source and the first switch to a reference potential terminal and is set in an open state in the first phase and in a closed state in the second phase.

7. The charge pump circuit according to claim 1, wherein at least one stage of the first and the at least second stage comprises a further switch that couples a second electrode of the capacitor to a reference potential terminal and is set in a closed state in the first phase and in an open state in the second phase.

8. The charge pump circuit according to claim 1, wherein the charge pump circuit operates self-timed and self-adapting such that its frequency of operation depends on an output current.

9. The charge pump circuit according to claim 1, further comprising a reference voltage circuit for generating the reference voltage based on a bandgap voltage and a signal from a ramp rate control oscillator, wherein control signals for the first and the second phase are derived from the comparator signal only without further using the signal from the ramp rate control oscillator.

10. A method for generating a supply voltage with a charge pump circuit having a first stage and an at least second stage, which each comprises a capacitor and a current source, the method comprising:

in a first phase of operation, switching the capacitor of the first stage in series to the current source of the first stage for charging the capacitor of the first stage and switching the capacitor of the second stage in series to the current source of the second stage for charging the capacitor of the second stage;

in a second phase of operation, providing a supply voltage at an output by switching the capacitor of the first stage and the capacitor of the second stage in series;

generating a comparator signal by comparing a voltage at an electrode of one of the capacitors of the first and the at least second stage with a reference voltage; and setting the first and the second phase on the basis of the comparator signal, wherein the current sources are controlled such that the currents provided by the current sources rise with rising temperature.

11. The method according to claim 10, wherein the currents of the current sources flow to a reference potential terminal during the second phase.

12. The method according to claim 10 or 11, wherein a feedback voltage is tapped across the capacitor of one of the first and the at least second stage and is used to control a duration of at least one phase of a group comprising the first and the second phase.

13. The method according to claim 10, wherein the capacitors are discharged during a first sub-phase of the first phase.

14. The method according to claim 10, wherein the first and the at least second stage each comprise:

a first switch arranged between the current source of the respective stage and a first electrode of the capacitor of the respective stage; and a second switch arranged between the first electrode of the capacitor of the respective stage and an output of the respective stage, the method further comprising:

setting the first switch to a closed state in the first phase and to an open state in the second phase: and setting the second switch to an open state in the first phase and to a closed state in the second phase.

15. The method according to claim 14, wherein control signals for the first and the second switch are derived from the comparator signal.

16. A charge pump circuit, comprising:

a first stage and an at least second stage, each having a capacitor and a current source;

a comparator having:

a first input which is coupled to an electrode of one of the capacitors of the first and the at least second stage, a second input for receiving a reference voltage, and an output for generating a comparator signal; and a reference voltage circuit for generating the reference voltage based on a bandgap voltage and a signal from a ramp rate control oscillator, wherein the charge pump circuit is configured such that, in a first phase of operation, the capacitor of the first stage is switched in series to the current source of the first stage for charging the capacitor of the first stage and the capacitor of the second stage is switched in series to the current source of the second stage for charging the capacitor of the second stage and that, in a second phase of operation, the capacitor of the first stage and the capacitor of the second stage are switched in series for providing a supply voltage at an output of the charge pump circuit, and wherein the first and the second phase are set depending on the comparator signal and control signals for the first and the second phase are derived from the comparator signal only without further using the signal from the ramp rate control oscillator.

* * * * *